United States Patent
Son et al.

(10) Patent No.: US 12,485,826 B2
(45) Date of Patent: Dec. 2, 2025

(54) SLIDABLE CONSOLE BOX

(71) Applicants: HYUNDAI MOTOR COMPANY, Seoul (KR); KIA CORPORATION, Seoul (KR); KBI DONGKOOK IND. CO., LTD., Seoul (KR)

(72) Inventors: Dong Il Son, Ulsan (KR); Dong Yong Choi, Suwon-si (KR); Chang Bok Park, Ulsan (KR); Sun Kyung Kim, Ulsan (KR); Jung-hoon Woo, Suwon-si (KR); Hong-sik Chang, Hwaseong-si (KR); Kwan-woo Lee, Suwon-si (KR); Jeong-won Seo, Hwaseong-si (KR)

(73) Assignees: HYUNDAI MOTOR COMPANY, Seoul (KR); KIA CORPORATION, Seoul (KR); KBI DONGKOOK IND. CO., LTD., Seoul (KR)

( * ) Notice: Subject to any disclaimer, the term of this patent is extended or adjusted under 35 U.S.C. 154(b) by 311 days.

(21) Appl. No.: 17/945,580

(22) Filed: Sep. 15, 2022

(65) Prior Publication Data
US 2023/0084592 A1    Mar. 16, 2023

(30) Foreign Application Priority Data

Sep. 16, 2021    (KR) .......................... 10-2021-0123865

(51) Int. Cl.
*B60R 7/04*        (2006.01)
*B60R 11/00*      (2006.01)

(52) U.S. Cl.
CPC ......... *B60R 7/04* (2013.01); *B60R 2011/0007* (2013.01); *B60R 2011/0084* (2013.01)

(58) Field of Classification Search
CPC ............... B60R 7/04; B60R 2011/0084; B60R 2011/0007
USPC ............................................. 296/37.8, 24.34
See application file for complete search history.

(56) References Cited

U.S. PATENT DOCUMENTS

| | | | | |
|---|---|---|---|---|
| 5,617,929 | A * | 4/1997 | Richardson ............. | B60N 2/90 180/326 |
| 7,543,874 | B2 * | 6/2009 | Ogura ...................... | B60R 7/04 296/37.8 |
| 8,444,196 | B2 * | 5/2013 | Arndt ....................... | B60R 7/04 296/187.05 |
| 9,227,491 | B1 * | 1/2016 | Story, Jr. ................. | B60J 7/041 |
| 10,661,717 | B2 * | 5/2020 | Lee .......................... | B60R 7/04 |
| 10,920,824 | B2 * | 2/2021 | Herchenreder ......... | B60N 2/77 |
| 11,958,440 | B2 * | 4/2024 | Chen ....................... | B60R 7/04 |
| 2007/0182188 | A1 * | 8/2007 | Penner .................... | B60R 7/06 296/37.12 |
| 2013/0127199 | A1 * | 5/2013 | Mildner ................... | B60R 7/04 296/37.8 |

(Continued)

FOREIGN PATENT DOCUMENTS

| | | | | |
|---|---|---|---|---|
| CN | 111301295 A | * | 6/2020 | |
| DE | 102016225839 B4 | * | 5/2021 | ........... B60N 2/0705 |

(Continued)

*Primary Examiner* — Daniel J Colilla
(74) *Attorney, Agent, or Firm* — Lempia Summerfield Katz LLC

(57) ABSTRACT

A slidable console box includes a rail frame fixedly coupled between a driver seat and a passenger seat of a vehicle, a rail unit slidably coupled to the rail frame along a length direction, and a movement controller coupled to the rail unit and configured to control a position of the rail unit.

9 Claims, 11 Drawing Sheets

(56) References Cited

U.S. PATENT DOCUMENTS

2022/0153202 A1* 5/2022 Beyersdorfer ............ B60R 7/06
2023/0044105 A1* 2/2023 Sumi ........................ H02K 9/20

FOREIGN PATENT DOCUMENTS

| EP | 1445152 A1 * | 8/2004 | ............ B60N 2/773 |
|---|---|---|---|
| FR | 3030401 A1 * | 6/2016 | ............ B60N 2/773 |
| JP | 2000052875 A | 2/2000 | |
| JP | 2000255324 A * | 9/2000 | |
| KR | 20040097970 A | 11/2004 | |
| KR | 20050045430 A | 5/2005 | |
| KR | 200390967 Y1 * | 7/2005 | ............ B60R 11/02 |
| KR | 20190053422 A | 5/2019 | |
| KR | 20190119704 A | 10/2019 | |

* cited by examiner

SLIDABLE CONSOLE BOX

CROSS-REFERENCE TO RELATED APPLICATION

This application claims priority to and the benefit of Korean Patent Application No. 10-2021-0123865 filed in the Korean Intellectual Property Office on Sep. 16, 2021, the entire contents of which are incorporated herein by reference.

BACKGROUND

(a) Field

The present disclosure relates to a slidable console box, and more particularly, to a slidable console box provided to be reciprocally movable between a driver seat and a passenger seat of a vehicle, thereby enhancing spatial utility of the vehicle interior.

(b) Description of the Related Art

In general, the storage space in the interior of a vehicle includes a console box, a glove box, an overhead box, and the like. These storage spaces are for storing items used in the interior of the vehicle depending on their locations, and are installed to be opened and closed for the user's convenience.

Among the storage spaces, the console box, which is also called a center console, is a box-shaped storage space provided between the driver seat and the passenger seat, and typically positioned together with the gear shift lever. The console box is useful for storing frequently used items, since the console box is provided between the driver seat and the passenger seat such that the stored items may be easily used. In addition, the upper part (e.g., a lid) of the console box is typically made of a soft material and may be used as an armrest for a driver or a passenger.

Meanwhile, in the case of recent automobiles, there is a trend that an autonomous driving system is installed. The autonomous driving system provides a function capable of automatically driving a vehicle by controlling the vehicle without a driver's operation. The autonomous driving function currently installed in vehicles provides partially autonomous driving, which may control the speed and steering, parking assistance, obstacle avoidance, etc., of the vehicle, and the autonomous driving technology is continuously developing. Therefore, as the technological limitations of the autonomous driving function are being overcome, there is a high possibility of gradually developing into a fully autonomous driving function, and accordingly, various activities may be performed while driving by utilizing the space in the vehicle.

The existing console box provided in the vehicle between the driver seat and the passenger seat is fixedly mounted to the vehicle body. The console box plays an important role in forming a space on the front seat side. Therefore, as the scope of autonomous driving is being expanded as described above, it will be beneficial to increase the space utilization by configuring the console box to be movable.

The above information disclosed in this Background section is only to enhance understanding of the background of the disclosure, and therefore it may contain information that does not form the prior art that is already known to a person of ordinary skill in the art.

SUMMARY

The present disclosure provides a slidable console box capable of enabling sliding of a console box main body and easily controlling a moving distance by the user.

A slidable console box includes a rail frame fixedly coupled between a driver seat and a passenger seat of a vehicle, a rail unit slidably coupled to the rail frame along a length direction, and a movement controller coupled to the rail unit and configured to control a position of the rail unit.

The rail frame may include a pair of outer rails disposed apart from each other in a width direction, and a positioning member which is provided between the pair of outer rails and formed with a plurality of positioning holes in a length direction.

The rail unit may include a pair of inner rails slidably coupled to the pair of outer rails, and a stopper coupled to the inner rail and configured to limit a moving distance of the inner rail.

The stopper may include a first stopping member coupled between the pair of inner rails and configured to be contactable with a fixed member provided on the rail frame. The stopper may further include a second stopping member provided in a length direction end portion of the inner rail and configured to be contactable with a frontal end of the outer rail.

The movement controller may include a rotation linkage portion, and a coupling body coupled to or decoupled from the positioning member in conjunction with a rotation movement of the rotation linkage portion. The movement controller may further include an elastic portion connected to the rotation linkage portion and the coupling body, and the elastic portion is configured to elastically restore the rotation linkage portion and the coupling body.

The coupling body may include a coupling plate having a plurality of insertion protrusions protruding downward to be selectively inserted into the positioning hole, and a curved portion coupled to the coupling plate and formed as a curved surface inclined upward in a direction from a first side to a second side. The coupling body may further include a rotation inducing plate coupled to a second side of the curved portion and disposed to be in contact with the rotation linkage portion.

The rotation linkage portion may include a pair of fixed bodies fixedly coupled to the inner rail, a center shaft coupled between the pair of fixed bodies, and a lever rotatable around the center shaft and configured to rotate the coupling body by a first end contacting the rotation inducing plate.

When the lever is rotated upward, the coupling plate may rotate upward, and the insertion protrusion may be decoupled from the positioning hole to enable the inner rail to be movable. When the lever is elastically restored downward, the coupling plate may be elastically restored downward, and the insertion protrusion may be coupled to the positioning hole to fix a position of the inner rail.

The elastic portion may include a first elastic member connected to the rotation linkage portion and configured to elastically restore the lever, and a second elastic member which is connected to the coupling body and configured to elastically restore the coupling body.

The rail unit may include a plurality of rail casters provided on both side surfaces of the inner rail, and disposed apart from each other in a length direction.

A rail caster disposed on a first surface among the both side surfaces of the inner rail may be in rolling contact with a guide rail protruding downward from an upper portion of the outer rail. A rail caster disposed on a second surface among the both side surfaces of the inner rail may be in rolling contact with a guide rail protruding upward from a lower surface of the outer rail.

A slidable console box may further include a speed control caster in rolling contact with the rail frame while being rotatably provided in the rail unit.

A plurality of rotation center holes each being a rotation center of the speed control caster may be provided in the rail unit. The plurality of rotation center holes may be provided on a lateral side of the rail unit with different heights along a length direction of the rail unit.

An overlap amount between the speed control caster and the rail frame may be in a range of from 0.5 millimeter (mm) to 2.5 mm.

According to a slidable console box according to the present disclosure, since the console box may be slidably moved to a desired position through a rail unit, thereby improving utility of a space between a driver seat and a passenger seat.

In addition, since the sliding distance of the console box may be selectively adjusted through the movement controller, the use efficiency may be increased.

In addition, the rail casters are cross-arranged vertically along the length direction of the inner rail, and are provided on both sides of the inner rail to facilitate movement.

BRIEF DESCRIPTION OF THE DRAWINGS

In order that the disclosure may be well understood, there will now be described various forms thereof, given by way of example, reference being made to the accompanying drawings, in which.

Figure 1:
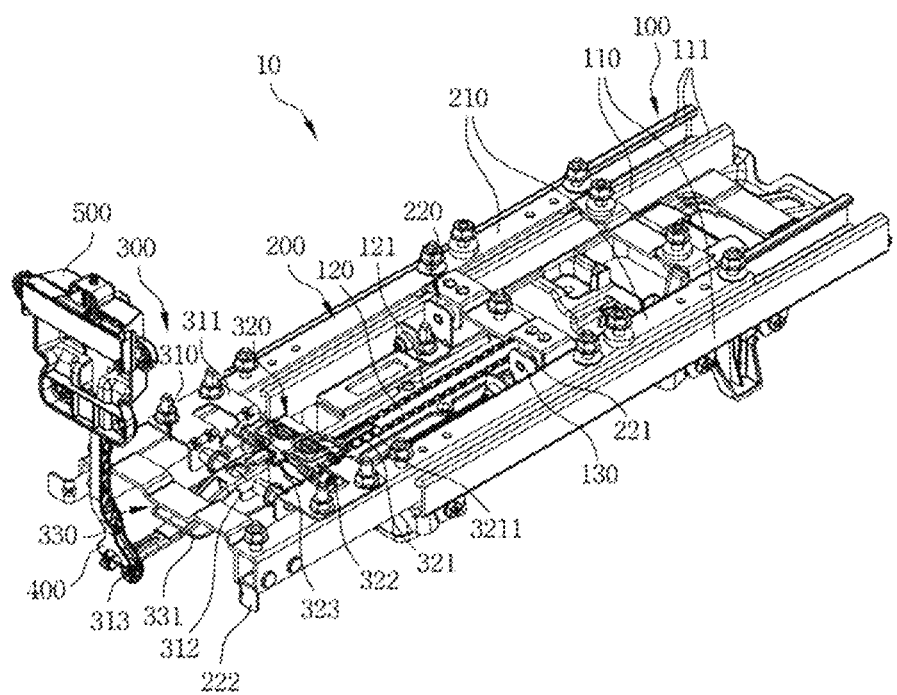
FIG. 1 is a perspective view of a slidable console box according to an embodiment.
Figure 2:
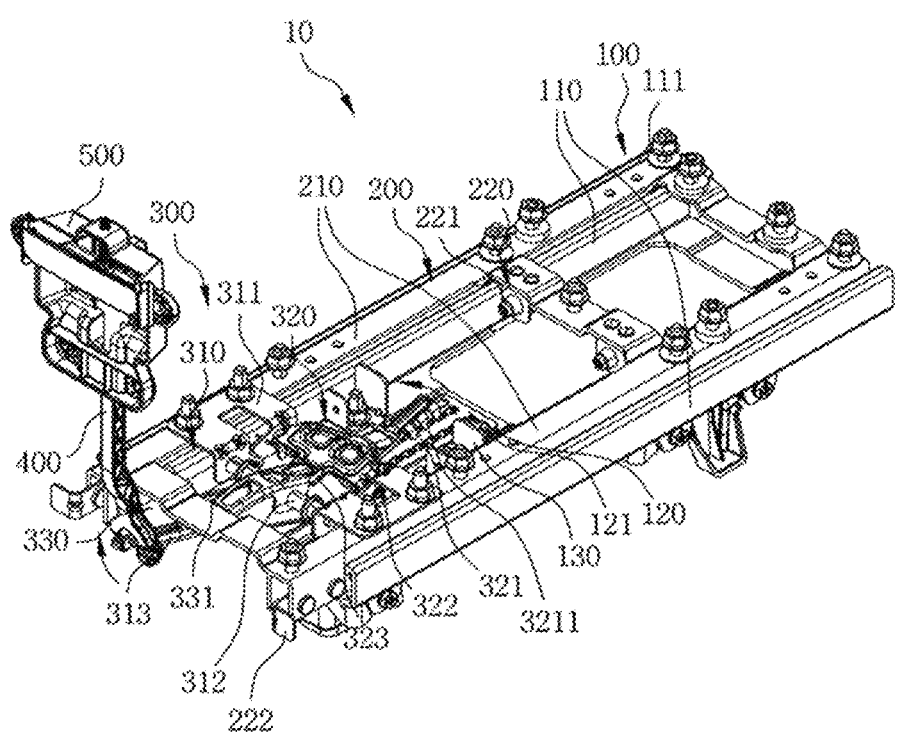
FIG. 2 is a perspective view showing a state in which a rail unit of a slidable console box of FIG. 1 has moved.

The drawings described herein are for illustration purposes only and are not intended to limit the scope of the present disclosure in any way.

DETAILED DESCRIPTION

Hereinafter, an embodiment is described in detail with reference to the accompanying drawings. Above all, the terms or words used in the present disclosure and claims should not be construed as being limited to conventional or dictionary meanings, and should be interpreted as meanings and concepts consistent with the technical idea of the present disclosure, considering the principle that the inventor may define the terms and words in order to best describe the present disclosure. When a component, device, element, or the like of the present disclosure is described as having a purpose or performing an operation, function, or the like, the component, device, or element should be considered herein as being "configured to" meet that purpose or to perform that operation or function.

Therefore, the embodiments described in this specification and the configurations shown in the drawings may be merely some forms of the present disclosure, and do not represent all of the technical spirit of the present disclosure, so it should be understood that there may be variations that are equivalent at the time of the present application.

Hereinafter, an embodiment is described in detail with reference to the accompanying drawings.

Referring to FIG. 1 to FIG. 8, a slidable console box (hereinafter, also called a console box) 10 according to an embodiment is provided between a driver seat and a passenger seat to store items. The slidable console box includes a storage portion (not shown) of which an upper part may be opened and closed by a user. In other words, the storage portion may form an interior space for storing the items, and is disposed between a driver seat and a passenger seat, thereby being usable as an armrest of the user.

The console box 10 is capable of slidably moving the storage portion and may be used appropriately by adjusting the position, such as securing a space between the driver seat and the passenger seat, or using an upper surface of the storage portion as an armrest. The slidable console box 10 may include a rail frame 100, a rail unit 200, a movement controller 300.

The rail frame 100 is disposed between a driver seat and a passenger seat of the vehicle, and fixedly mounted on the vehicle. The rail frame 100 may include a pair of outer rails 110, a positioning member 120, and a fixed member 130.

Figure 3:
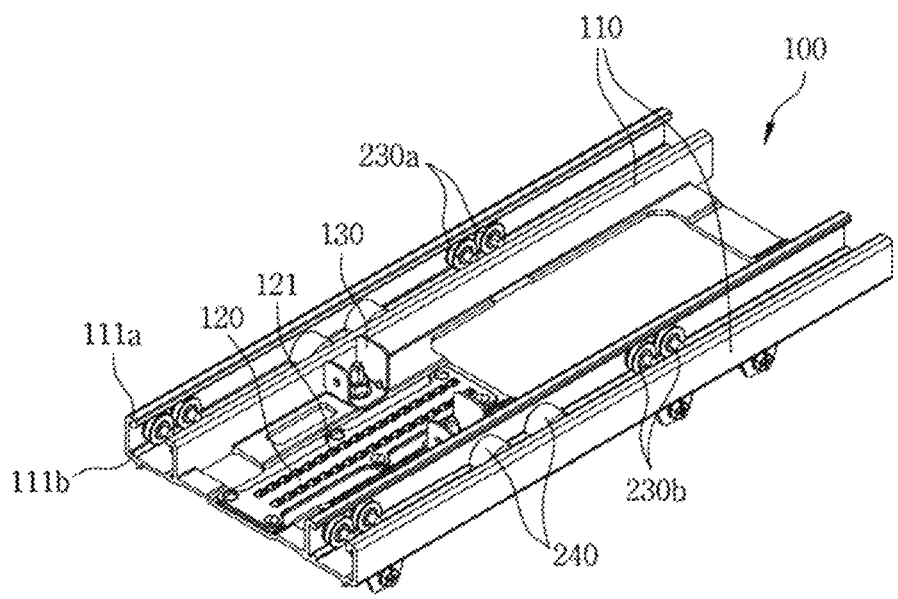
FIG. 3 is a perspective view showing a rail frame, a rail caster, and a speed control caster of the slidable console box of FIG. 1.

The pair of outer rails 110 is disposed apart from each other in a width direction. In other words, outer rails of the pair of outer rails 110 are coupled to each other and disposed apart from each other in the width direction within the vehicle. The outer rails 110 may be each formed in a 'C'-shaped cross-section with an open upper side. A guide rail 111 may be formed to protrude on both side surfaces of the outer rail 110. The guide rail 111 is for guiding a sliding movement of an inner rail 210 and protrudes in a length direction of the outer rail 110. A rail caster 230 may move along the guide rail 111 while being in contact with the guide rail 111. In more detail, as shown in FIG. 3, the guide rail 111 is respectively formed on both side surfaces of the 'C' shape of the outer rail 110, and the guide rail 111 includes a guide rail 111a protruding downward from an upper surface and a guide rail 111b protruding upward from a lower surface. Since the guide rails 111a and 111b are respectively formed on the upper surface and the lower surface, the fluctuation generated during the linear reciprocating of the inner rail 210 along the length direction of the outer rail 110 may be reduced or minimized, and the inner rail 210 may be prevented from separating from the outer rail 110, thereby achieving stable sliding movement.

The positioning member 120 is for determining a sliding position of the console box 10 and provided between the pair of outer rails 110. In one embodiment, the positioning member 120 may be formed in a plate shape and provided on a first side of a central portion of the rail frame 100. A plurality of positioning holes 121 may be formed on the positioning member 120, and the plurality of positioning holes 121 may be arranged along a length direction of the positioning member 120. In more detail, an insertion protrusion 3211 that is described below may be selectively inserted into the positioning hole 121. Meanwhile, the positioning member 120 may be made of a plastic material formed by injection molding. Since the positioning member 120 is made of a plastic material, and thus formed of a different material with the insertion protrusion 3211 that is formed of a metal material, when the insertion protrusion 3211 is inserted into the positioning hole 212, it is possible to prevent noise from being generated by a collision therebetween and to minimize the occurrence of scratches.

The fixed member 130 limits a moving distance of the console box 10 that slides, and the fixed member 130 is provided to protrude from an upper surface of the rail frame 100. The fixed member 130 is capable of limiting a forward moving distance of the console box 10 by contacting a first stopping member 221, and thus may be provided in positions and in a number that corresponds to the first stopping member 221.

The rail unit 200 is for slidably moving the console box 10, and is slidably coupled to the rail frame 100 along a length direction. The storage portion may be coupled to an upper surface of the rail unit 200, and the storage portion may slide together with the rail unit 200 when the rail unit 200 slides. The rail unit 200 may include a pair of inner rails 210, a stopper 220, and a plurality of rail casters 230.

The pair of inner rails 210 are slidably coupled to the pair of outer rails 110, respectively. In other words, the inner rail 210 is coupled to be capable of linearly reciprocating along the length direction of the outer rail 110. In one embodiment, the inner rail 210 is formed in a 'C'-shaped cross-section with an open lower side.

The stopper 220 is for limiting a moving distance of the inner rail 210. The stopper 220 is coupled to the inner rail 210 and may limit a sliding distance of the inner rail 210 by contacting the rail frame 100. The stopper 220 may include the first stopping member 221 and a second stopping member 222.

The first stopping member 221 is for limiting a forward moving distance of the inner rail 210, and coupled between the pair of inner rails 210. The first stopping member 221 is provided on a lower portion of a central bar that connects the pair of inner rails 210, and in contact with the fixed member 130 provided on the rail frame 100. In more detail, the first stopping member 221 is provided to protrude on the lower portion of the central bar, and when the inner rail 210 moves forward, may contact the fixed member 130 to limit the forward moving distance of the inner rail 210.

The second stopping member 222 is for limiting a backward moving distance of the inner rail 210, and coupled to a length direction end portion of the inner rail 210. That is, the second stopping member 222 is provided to protrude on a frontal end portion of the inner rail 210, and may contact a frontal end of the outer rail 110. In more detail, the second stopping member 222 is provided to protrude in a direction of an exterior surface of the inner rail 210, and when the inner rail 210 moves backward, may contact the outer rail 110 to limit the backward moving distance of the inner rail 210.

The plurality of rail casters 230 are rotatably provided on both side surfaces of the inner rail 210, in rolling contact with the outer rail 110. The rail caster 230 are provided on the both side surfaces of the inner rail 210, and may be disposed on the both side surfaces of the 'C' shape of the outer rail 110. The plurality of rail casters 230 are in rolling contact with the outer rail 110 such that the console box 10 may easily move. The plurality of rail casters 230 are disposed apart from each other in a length direction on the both side surfaces of the inner rail 210. The plurality of rail casters 230 is disposed on positions corresponding to the guide rail 111, and may slide under the guide of the guide rail 111.

For reference, although FIG. 3 illustrates as if the plurality of rail casters 230 and a speed control caster 240 that is described below are provided on the outer rail 110 of the rail frame 100, this is because the illustration of the inner rail 210 is omitted in FIG. 3 in order to easily understand the appearance of the rail caster 230 and the speed control caster 240 arranged on the outer rail 110 when the outer rail 110 and the inner rail 210 are coupled.

Figure 7:
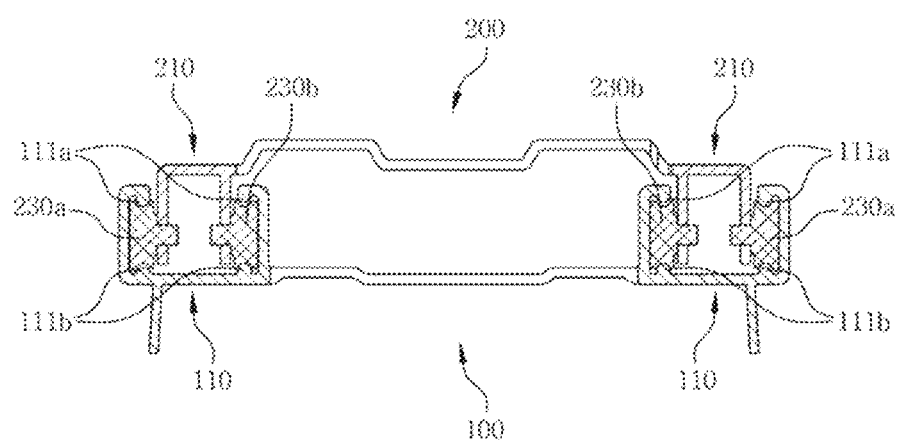
FIG. 7 is a cross-sectional view illustrating a guide rail, an inner rail, and a rail caster of the slidable console box of FIG. 1.

Referring to FIG. 7, the plurality of rail casters 230 may include a rail caster 230*a* in rolling contact with the guide rail 111*a* protruding downward from an upper portion of the outer rail 110 and a rail caster 230*b* in rolling contact with the guide rail 111*b* protruding upward from a lower surface of the outer rail 110. At this time, the rail caster 230*a* provided outward with reference to a central portion of the slidable console box 10 in a cross-section formed as the 'C' shape of the inner rail 210 may be in rolling contact with the guide rail 111*a*, and the rail caster 230*b* provided inward with reference to the central portion of the slidable console box 10 in a cross-section formed as the 'C' shape of the inner rail 210 may be in rolling contact with the guide rail 111*b*.

For this purpose, in the 'C' shape of the outer rail 110, the guide rail 111*a* protruding on a side surface formed outward with reference to the central portion of the slidable console box 10 may be formed to protrude further downward than the guide rail 111*a* protruding on the side surface formed inward to contact the rail caster 230*a*. In addition, in the 'C' shape of the outer rail 110, the guide rail 111*b* protruding on a side surface formed inward with reference to the central portion of the slidable console box 10 may be formed to protrude further upward than the guide rail 111*b* protruding on the side surface formed outward to contact the rail caster 230*b*.

That is, among the plurality of rail casters 230*a* and 230*b* provided on the exterior surface of the inner rail 210, the rail caster 230*a* may be provided on a first surface among the both side surfaces of the inner rail 210, and the rail caster 230*b* may be provided is on a second surface of among the both side surfaces of the inner rail 210. Accordingly, the rail casters 230*a* and 230*b* are provided to be cross-arranged on each surface with different centers of rotation. Since the rail casters 230*a* and 230*b* are provided to be cross-arranged on and in contact with the guide rails 111*a* and 111*b*, friction area may be minimized to enable smooth movement. In addition, since the plurality of rail casters 230*a* and 230*b* are arranged on the both side surfaces of the inner rail 210, easy movement may be achieved.

Meanwhile, when the rail caster 230 becomes in a state in simultaneously rolling contact with the guide rails 111*a* and 111*b*, the load generated when the vehicle shakes is transmitted to the guide rails 111*a* and 111*b* through the storage portion, the inner rail 210, and the rail caster 230, and there is a possibility that the guide rails 111*a* and 111*b* may be deformed or damaged. Therefore, from the viewpoint of preventing deformation or damage of the guide rails 111*a* and 111*b* from external impact or shaking, the plurality of rail casters 230a and 230b and the guide rails 111a and 111b cross each other to make rolling contact in the manner as above.

Figure 4:
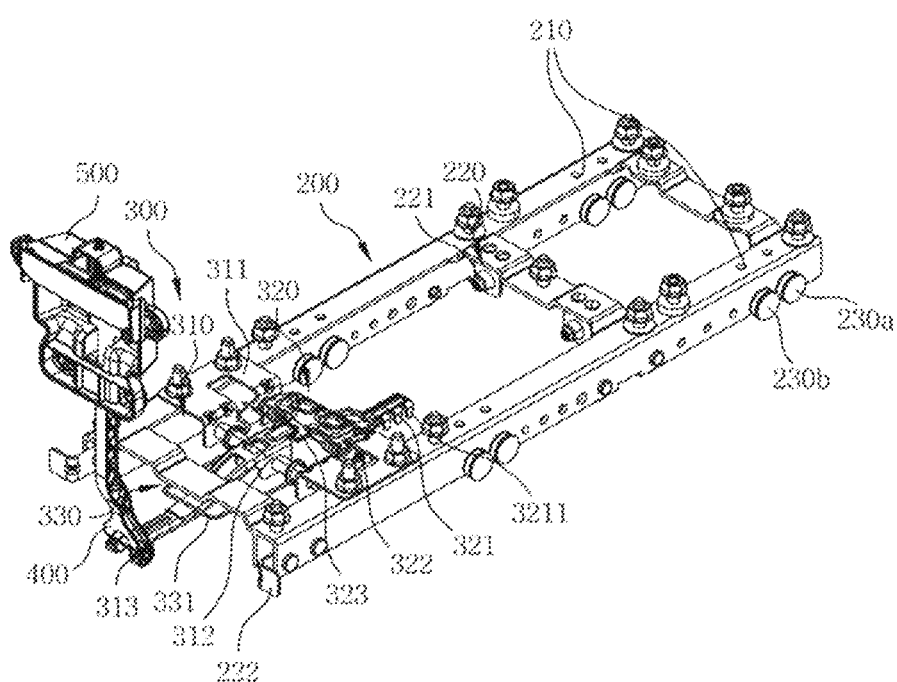
FIG. 4 is a perspective view showing a rail unit and a movement controller of the slidable console box of FIG. 1.
Figure 5:
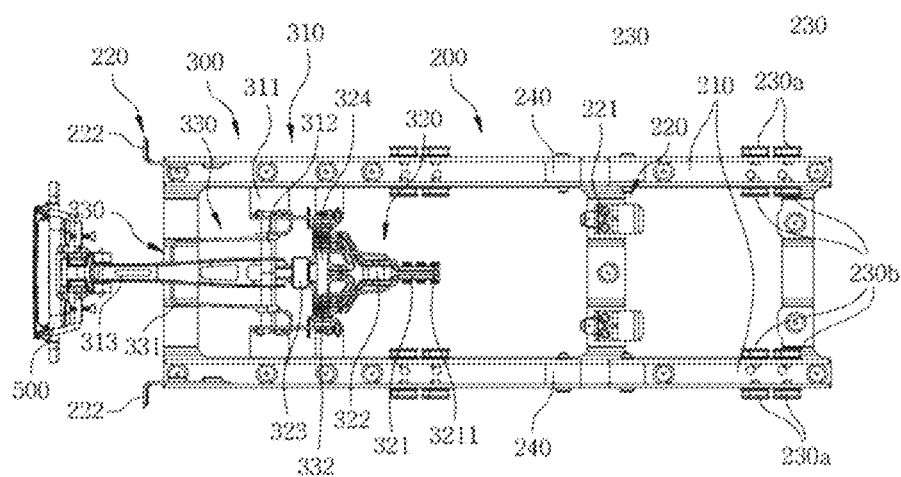
FIG. 5 is a bottom view showing a rail unit and a movement controller of the slidable console box of FIG. 1.
Figure 6:
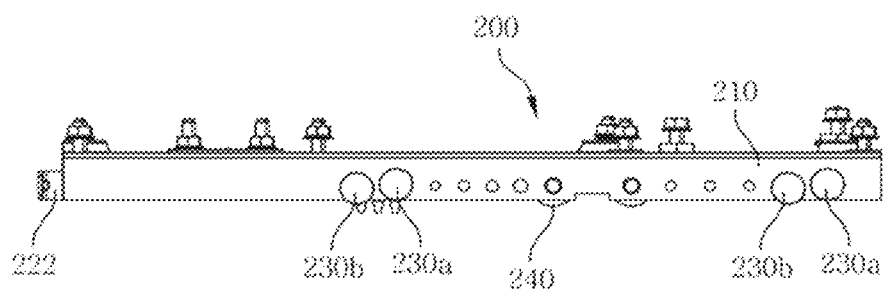
FIG. 6 is a side view of an inner rail of the slidable console box of FIG. 1.

Meanwhile, as shown in FIG. 4 to FIG. 6, the rail casters 230a and 230b respectively provided on the both side surfaces of the inner rail 210 may be provided on a length direction first end side (forward side) and a length direction second end side (rearward side) of the inner rail 210, respectively, for a stable movement of the inner rail 210 when the inner rail 210 linearly reciprocates on the outer rail 110.

In an embodiment, although drawings illustrate that eight rail casters 230a and 230b are provided on the length direction first end side of the inner rail 210, and eight rail casters 230a and 230b are also provided on the length direction second end side of the inner rail 210, such that sixteen rail casters 230a and 230b in total are provided on the inner rail 210, the present disclosure is not limited thereto.

For example, four rail casters 230a and 230b may be provided on the length direction first end side of the inner rail 210, and also on the length direction second end side of the inner rail 210, respectively, such that eight rail casters 230a and 230b in total may be provided on the inner rail 210.

For another example, two rail casters 230a and 230b may be provided on the length direction first end side of the inner rail 210, and two rail casters 230a and 230b may be provided on the length direction second end side of the inner rail 210, such that four rail casters 230a and 230b in total may be provided on the inner rail 210.

For another example, three rail casters 230a and 230b may be provided on the length direction first end side of the inner rail 210, and three rail casters 230a and 230b may be provided on the length direction second end side of the inner rail 210, such that four rail casters 230a and 230b in total may be provided on the inner rail 210.

However, in order to minimize fluctuation generated during movement of the inner rail 210 and to reduce noise caused thereby, the rail casters 230a and 230b may be provided on the inner rail 210 in the number range of twelve to sixteen.

When the rail casters 230a and 230b less than twelve are provided on the inner rail 210, there is not a problem in terms of moving the inner rail 210, but there may be a disadvantage in that fluctuation in vertical and/or horizontal directions and noised induced thereby may be generated while the inner rail 210 moves.

In addition, when the rail casters 230a and 230b more than sixteen are provided on the inner rail 210, there is not a problem in terms of moving the inner rail 210, but there may be a disadvantage in that manufacturing cost of the console box 10 may be increased.

Therefore, the rail casters 230a and 230b may be provided on the length direction first end side, an intermediate side, and the second end side of the inner rail 210, respectively, in a total number between twelve and sixteen.

Figure 8:
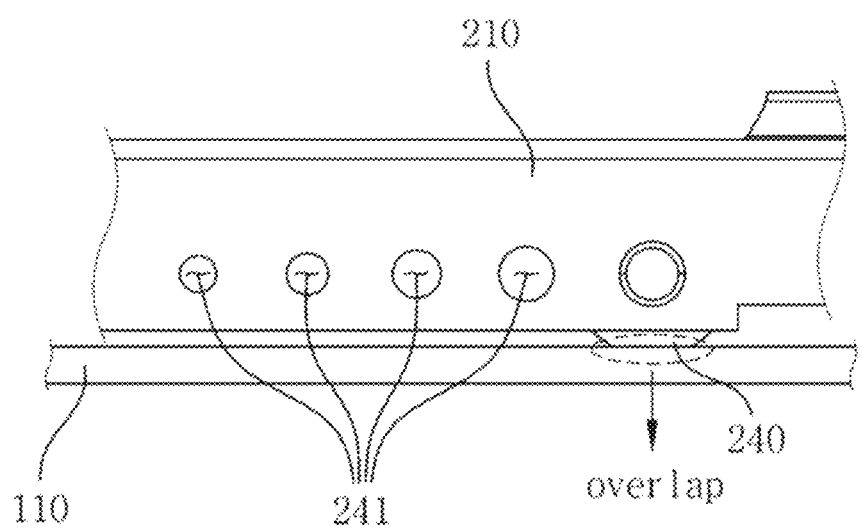
FIG. 8 is a view showing a rotation center hole into which a speed control caster according to an embodiment is mounted.

In addition, as shown in FIG. 3, FIG. 6, and FIG. 8, the slidable console box 10 according to an embodiment may further include the speed control caster 240 in rolling contact with the rail frame 100 while being rotatably provided in the rail unit 200.

The speed control caster 240 provides a function of controlling a speed of the rail unit 200 sliding on the rail frame 100.

In more detail, the speed control caster 240 is a constituent element for assisting the inner rail 210 to stably slide by setting a speed of the inner rail 210 sliding on the outer rail 110.

A plurality of speed control casters 240 may be provided in the inner rail 210. That is, the speed control caster 240 is rotatably provided in an interior of the 'C' shape of the inner rail 210, and in rolling contact with the outer rail 110. The speed control caster 240 is formed of a rubber material having an elastic restoring force, and rotates with an exterior surface in contact with the outer rail 110. By being formed of the rubber material, the speed control caster 240 is in friction contact with the outer rail 110 to prevent skidding of the inner rail 210, thereby enabling stable sliding. In more detail, the speed control caster 240 may be disposed to be in contact with a lower surface of the 'C' shape of the outer rail 110, and may be provided in a plural number disposed apart from each other on each of a pair of inner rails 210. By the frictional force between the speed control caster 240 and the outer rail 110, the user may control the operational force for sliding the storage portion of the console box 10, and may move the storage portion in a desired speed, thereby easily controlling the position of the inner rail 210.

As described above, the speed control caster 240 is rotatably mounted in an interior space of the 'C' shape of the inner rail 210, and its partial portion is exposed through a lower portion of the inner rail 210, to be in rolling contact with a bottom surface of the outer rail 110.

At this time, the moving speed of the inner rail 210 may be determined according to the level of overlap by which the portion of the speed control caster 240 exposed through the lower portion of the inner rail 210 and the outer rail 110 overlap each other.

That is, since the speed control caster 240 is fabricated in a material having an elastic restoring force, an overlap occurs when contacting the outer rail 110, and the moving speed of the inner rail 210 may be controlled according to the overlap amount.

As shown in the table of experimental result shown below, as the overlapping level of the speed control caster 240 and the bottom surface of the outer rail 110 is larger, the force required for sliding the inner rail on the outer rail 110 is larger.

For example, when an overlap amount between the speed control caster 240 and the outer rail 110 is 0.5 mm, since the force required for moving the inner rail 210 is 0.9 kgf, the moving speed of the inner rail 210 is relatively faster than the case that the overlap amount between the speed control caster 240 and the outer rail 110 is above 0.5 mm.

In the contrast, when the overlap amount between the speed control caster 240 and the outer rail 110 is 2.5 mm, since the force required for moving the inner rail 210 is 2.4 kgf, the moving speed of the inner rail 210 is relatively slower than the case that the overlap amount between the speed control caster 240 and the outer rail 110 is 0.5 mm.

The operator may set an overlap amount between the speed control caster 240 and the bottom surface of the outer rail 110 by setting a rotation center of the speed control caster 240 mounted on the inner rail 210 to be close to or away from the bottom surface of the outer rail 110.

Therefore, the speed of the inner rail 210 linearly reciprocating on the outer rail 110 may be easily controlled by the operator, appropriately for the type of the vehicle, the purpose of use of the vehicle, and the user's preference.

For reference, an experiment for measuring the force for moving the inner rail 210 according to the overlap amount between the speed control caster 240 and the outer rail 110 may be performed by using a known push-pull gauge.

That is, the length direction first end or second end of the inner rail 210 may be pressurized by using the push-pull gauge, and a force induced thereby may be measured.

TABLE 1

| overlap amount between speed control caster and outer rail | force required for sliding inner rail |
|---|---|
| 0.5 mm | 0.9 kgf |
| 1 mm | 1.2 kgf |
| 1.5 mm | 1.5 kgf |
| 2 mm | 1.9 kgf |
| 2.5 mm | 2.4 kgf |

Meanwhile, as shown in FIG. 4, FIG. 6, and FIG. 8, a plurality of rotation center holes 241 each being the rotation center of the speed control caster 240 may be provided in the rail unit 200.

The rotation center hole 241 may be provided on a lateral side of the inner rail 210 with different heights along a length direction of the inner rail 210.

In an embodiment, it is illustrated in the drawings that five rotation center holes 241 are provided on the lateral side of the inner rail 210, and the five rotation center holes 241 are sequentially formed to be gradually farther from the bottom surface of the outer rail 110 as it goes from a first side to a second side in a length direction of the inner rail 210.

Therefore, a worker may rotatably mount the speed control caster 240 on the inner rail 210 by using one rotation center hole 241 among the plurality of rotation center holes 241. In addition, by selecting the overlap amount between the speed control caster 240 and the outer rail 110, the linear reciprocating speed of the inner rail 210 may be set appropriately for the type of the vehicle, the purpose of use of the vehicle, and the user's preference.

The overlap amount between the speed control caster 240 and the outer rail 110 may be set in 0.5-2.5 mm. When the overlap amount between the speed control caster 240 and the outer rail 110 is below 0.5 mm, the moving speed of the inner rail 210 is increased to cause the phenomenon that the inner rail 210 moves farther than the user's intended distance. In the contrast, when the overlap amount between the speed control caster 240 and the outer rail 110 exceeds 2.5 mm, the phenomenon that the inner rail 210 moves shorter than the user's intended distance.

The movement controller 300 is coupled to the rail unit 200 and configured to control a position of the rail unit 200. That is, the movement controller 300 is for controlling a sliding movement of the rail unit 200, and may include a rotation linkage portion 310, a coupling body 320, and an elastic portion 330.

The rotation linkage portion 310 is for rotating by receiving a user's force, and includes a pair of fixed bodies 311, a center shaft 312, and a lever 313.

The pair of fixed bodies 311 are fixedly coupled to the inner rail 210. That is, the pair of fixed bodies 311 may be fixedly coupled to the pair of inner rails 210, respectively.

The center shaft 312 is coupled between the pair of fixed bodies 311.

The lever 313 is coupled to and rotatable around the center shaft 312. The lever 313 may rotate by receiving a user's force, and for this purpose, may further include a handle connected to an end. In more detail, when the user rotates an end of the lever 313, a first end of the lever 313 rotates to contact a rotation inducing plate 323 that is described below, and thereby the coupling body 320 may be rotated.

For reference, as shown in the drawings, a connection device 400 fabricated in a plastic material or a metal material may be provided on the end of the lever 313. The connection device 400 provides a function of rotating the lever 313 when the user operates a handle 500.

That is, since a length direction first end of the connection device 400 is connected to a length direction end of the lever 313 and a length direction second end of the connection device 400 is connected to an operation rod of the handle 500, when the user operates the handle 500, the connection device 400 and the lever 313 are sequentially rotated in conjunction with the operation of the handle 500.

Since the connection device 400 may be a molded body of a plastic material or a metal material, there is an advantage in that the force transmitted from the user to the handle 500 is immediately transmitted to the end of the lever 313. In addition, due to relatively small deformation and high durability in comparison with a connection device (not shown) made of a wire or a tow cable, the frequency of replacement of component part due to damage or deformation may be remarkably reduced. For reference, the connection device made of a wire or a tow cable may be stretched or contracted by external forces and thus shows a disadvantage in that the user's force transmitted to the handle 500 may not immediately transmitted to the lever 313. Therefore, the connection device 400 that interconnects the handle 500 and the end of the lever 313 may be fabricated as a rigid injection molding product or a molded product made of a plastic material or a metal material.

As shown in FIG. 1 to FIG. 5 and FIG. 9, the coupling body 320 is for determining the sliding position of the rail unit 200 by being coupled to or decoupled from the positioning member 120, and may rotate by the rotation linkage portion 310. That is, the coupling body 320 may be coupled to or decoupled from the positioning member 120, in conjunction with a rotation movement of the rotation linkage portion 310. The coupling body 320 may include a coupling plate 321, a curved portion 322, and the rotation inducing plate 323.

The coupling plate 321 is slidably disposed on an upper portion of the positioning member 120. A plurality of insertion protrusions 3211 may protrude downward on the coupling plate 321, and the plurality of insertion protrusions 3211 may be selectively inserted into the positioning hole 121 as the coupling plate 321 rotates. That is, the sliding movement of the rail unit 200 may be fixed as the plurality of insertion protrusions 3211 are inserted into the positioning holes 121. Therefore, the position of the console box 10 may be controlled according to positions of the plurality of positioning holes 121 into which the plurality of insertion protrusions 3211 are inserted. Meanwhile, the coupling plate 321 may be rotated by the rotation of the lever 313.

Figure 9:
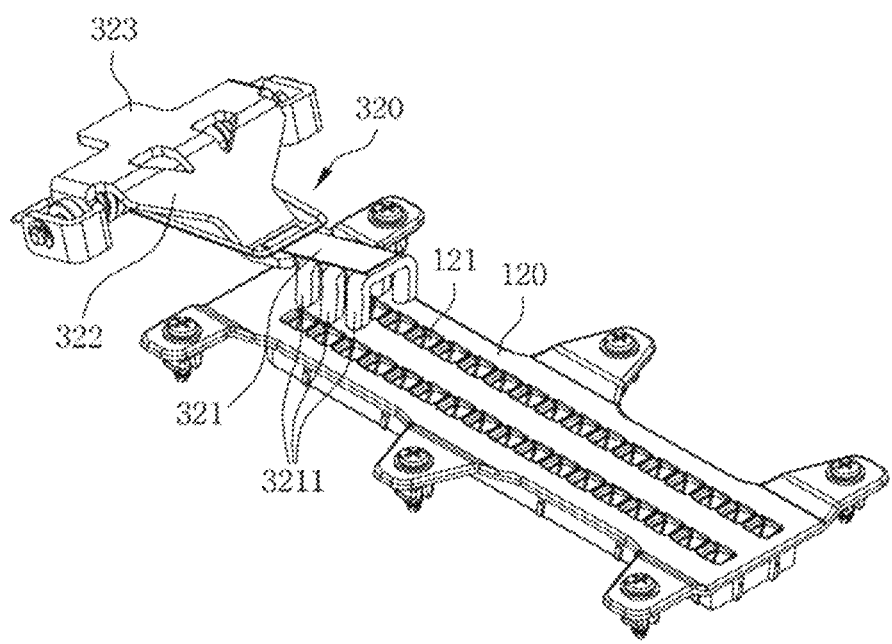
FIG. 9 is a perspective view showing detailed configuration of a coupling body and a positioning member according to an embodiment.
Figure 10:
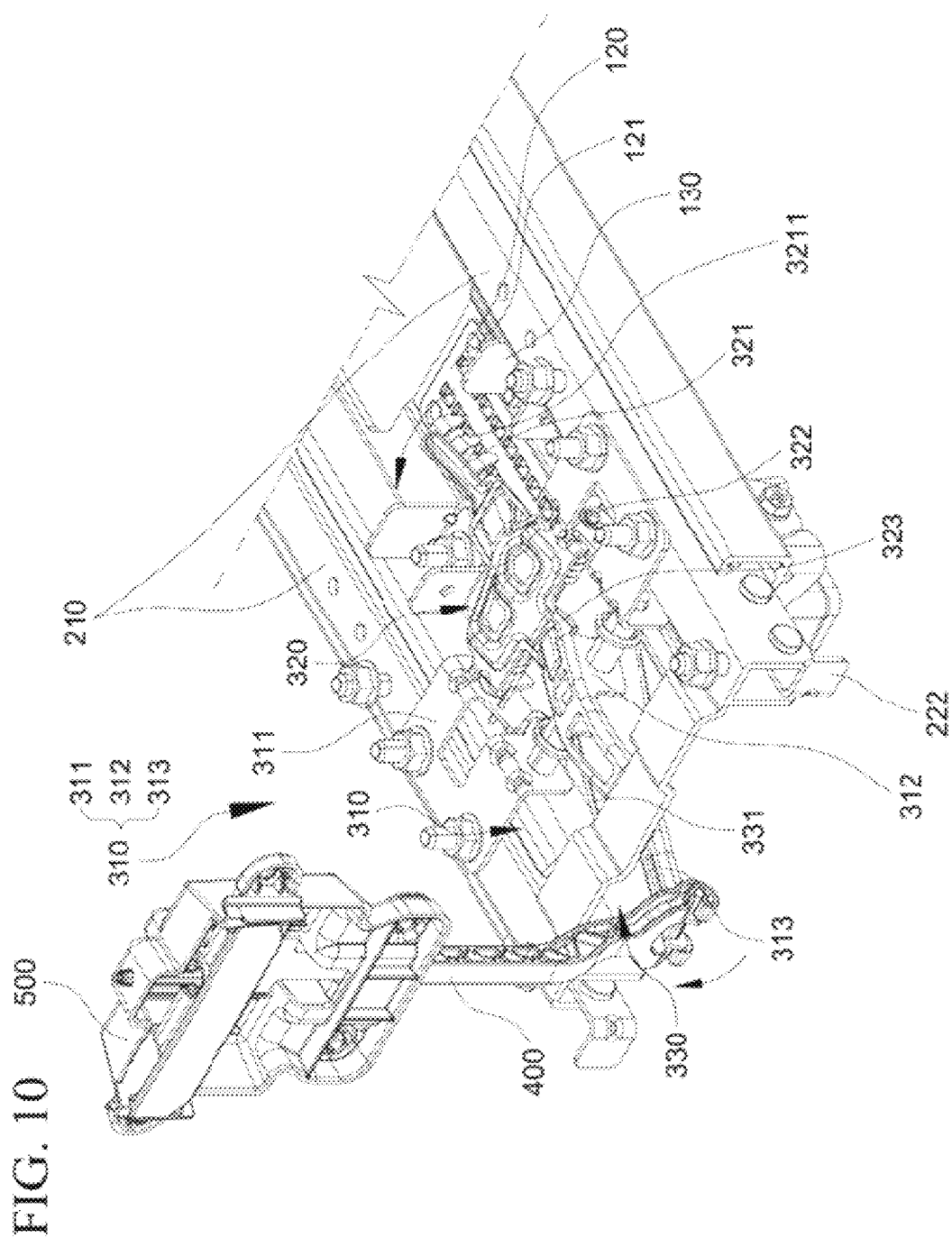
FIG. 10 is an enlarged partial view illustrating the front half of the console box shown in FIG. 2.
Figure 11:
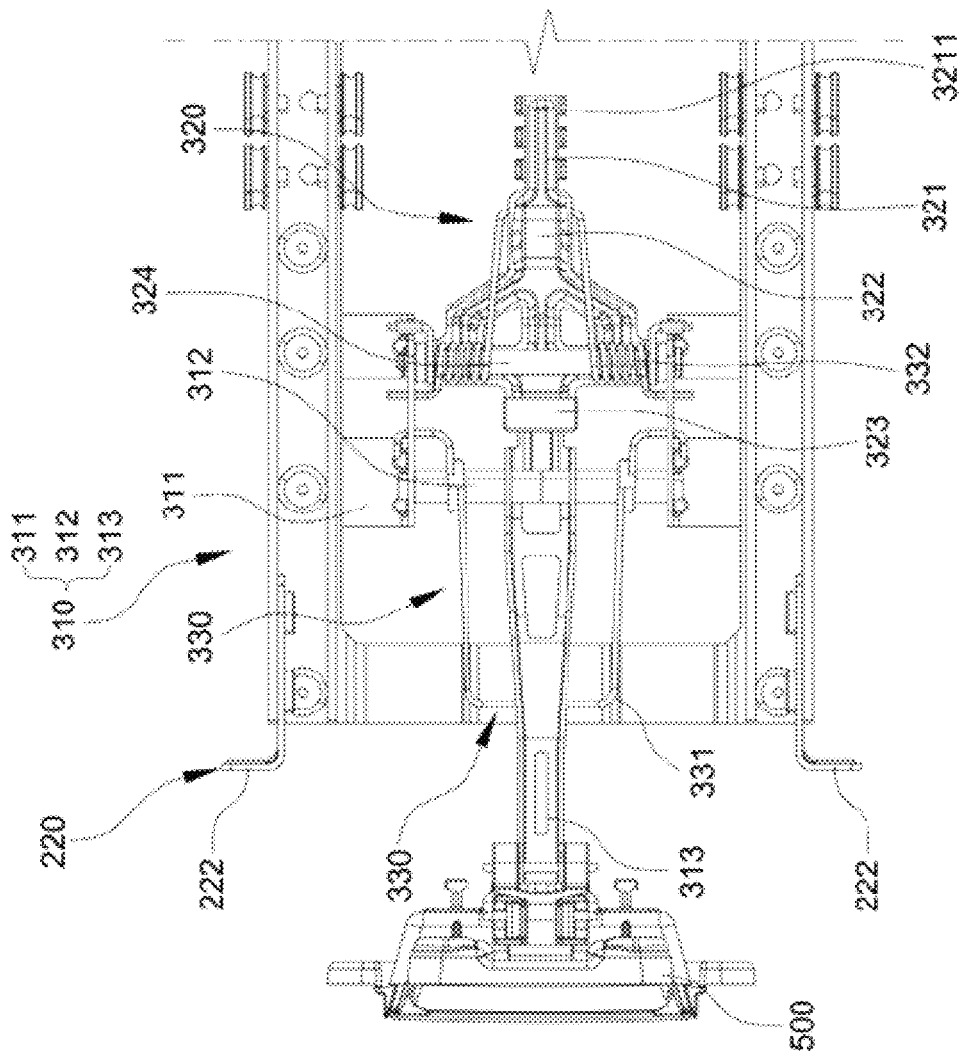
FIG. 11 is an enlarged partial view illustrating the front half of the console box shown in FIG. 5.

For reference, as shown in FIG. 9, the plurality of insertion protrusions 3211 may have different lengths. For example, the plurality of insertion protrusions 3211 may be disposed to have gradually larger length as it goes from a first side to a second side direction in a length direction of the coupling plate 321.

In addition, the plurality of insertion protrusions 3211 may protrude on the coupling plate 321 in an oblique direction, to be easily inserted into the positioning hole 121 formed in the positioning member 120. It may be understood that, since the coupling body 320 according to an embodiment is coupled to or decoupled from the positioning member 120 while rotating by a predetermined angle, the plurality of insertion protrusions 3211 may be easily inserted into or easily separated from the positioning hole 121 when obliquely disposed in the same direction with the rotating direction of the coupling body 320.

The curved portion 322 is coupled to the coupling plate 321 and formed as a curved surface inclined upward in a direction from a first side to a second side. In other words, the curved portion 322 is coupled to the coupling plate 321 through a first side, and the curved portion 322 may be inclined upward from the first side to a second side.

The rotation inducing plate 323 is coupled to a second side of the curved portion 322. The rotation inducing plate 323 is disposed to contact the rotation linkage portion 310 through a lower surface, and may rotate the coupling body 320 by the rotation linkage portion 310. In more detail, the coupling body 320 may rotate around a rotation center shaft 324 as the rotation inducing plate 323 moves downward, and the rotation center shaft 324 may be coupled to the fixed body 311.

The elastic portion 330 is for elastically restoring the rotation linkage portion 310 and the coupling body 320. The elastic portion 330 is connected to the rotation linkage portion 310 and the coupling body 320, and may restore the rotation linkage portion 310 and the coupling body 320 to original positions by an elastic force. The elastic portion 330 includes a first elastic member 331 and a second elastic member 332.

The first elastic member 331 is connected to the rotation linkage portion 310, and configured to elastically restore the lever 313. In one embodiment, a part of the first elastic member 331 may contact the lever 313, and after being elastically deformed by the user's force, the lever 313 may be restored to an original position by the elastic force when the user releases the force. In more detail, the first elastic member 331 has both ends coupled to the pair of fixed bodies 311, rotate around the center shaft 312, and has a central portion in contact with an upper surface of the lever 313.

The second elastic member 332 is connected to the coupling body 320, and configured to elastically restore the coupling body 320. In one embodiment, a part of the second elastic member 332 may contact the coupling body 320, and when the user applies a force, after being elastically deformed as the coupling body 320 rotates by the lever 313, the coupling body 320 may be restored to an original position by the elastic force when the user releases the force. In more detail, the second elastic member 332 has both ends coupled to the pair of fixed bodies 311, rotate around the rotation center shaft 324, and has a central portion in contact with a lower surface of the coupling plate 321.

In more detail, when a second end of the lever 313 is rotated upward, the first end of the lever 313 rotates downward, the first end of the lever 313 and the rotation inducing plate 323 becomes in contact with each other, and thereby the rotation inducing plate 323 rotates downward. In addition, the coupling plate 321 may rotate upward by the rotation of the rotation inducing plate 323. At this time, the first elastic member 331 is elastically deformed by being in contact with the upper surface of the lever 313 by the user's force, and the second elastic member 332 is elastically deformed by being in contact with the lower surface of the coupling plate 321. At this time, when the coupling plate 321 rotates upward by rotating the lever 313 upward, the insertion protrusion 3211 is decoupled from the positioning hole 121 to enable the inner rail 210 to move.

In the contrast, after the inner rail 210 is forced to slide, when the force is released, the lever 313 is elastically restored downward, and the coupling plate 321 is also elastically restored downward. Therefore, the insertion protrusion 3211 is coupled to the positioning hole 121 such that the position of the inner rail 210 may be fixed.

Meanwhile, the rail frame 100 is manufactured by an extrusion process, and it is possible to provide smooth sliding by improving the molding precision. In other words, when the rail frame 100 is manufactured in a roll forming method, the precision of the product is deteriorated and the rail caster 230 may not rotate smoothly. Therefore, when the rail frame 100 is manufactured by the extrusion process, there is an advantage in that the molding precision of the product may be improved. Accordingly, the rail caster 230 may be smoothly rotated along the rail frame 100.

According to the sliding console box 10 according to the present disclosure, the console box 10 may be slidably moved to a desired position through the rail unit 200, thereby improving utility of the space utilization between the driver seat and the passenger seat.

In addition, since the sliding distance of the console box 10 may be selectively adjusted through the movement controller 300, the use efficiency may be increased.

In addition, the rail casters 230 are cross-arranged vertically along the length direction of the inner rail, and are provided on both sides of the inner rail to facilitate movement.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the present disclosure.

<Description of symbols>

| | |
|---|---|
| 10: slidable console box | |
| 100: rail frame | 110: outer rail |
| 111a, 111b: guide rail | 120: positioning member |
| 121: positioning hole | 130: fixed member |
| 200: rail unit | 210: inner rail |
| 220: stopper | 221: first stopping member |
| 222: second stopping member | 230a, 230b: rail caster |
| 240: speed control caster | 300: movement controller |
| 310: rotation linkage portion | 311: fixed body |
| 312: center shaft | 313: lever |
| 320: coupling body | 321: coupling plate |
| 3211: insertion protrusion | 322: curved portion |
| 323: rotation inducing plate | 324: rotation center shaft |
| 330: elastic portion | 331: first elastic member |
| 332: second elastic member | 400: connection device |
| 500: handle | |

What is claimed is:

1. A slidable console box, comprising:
a rail frame fixedly coupled between a driver seat and a passenger seat of a vehicle;
a rail unit slidably coupled to the rail frame along a length direction; and
a movement controller coupled to the rail unit and configured to control a position of the rail unit,
wherein the rail frame comprises:
a pair of outer rails disposed apart from each other in a width direction; and
a positioning member provided between the pair of outer rails, and formed with a plurality of positioning holes in the length direction, and wherein the movement controller comprises:
a rotation linkage portion;
a coupling body coupled to or decoupled from the positioning member in conjunction with a rotation movement of the rotation linkage portion; and
an elastic portion connected to the rotation linkage portion and the coupling body, and configured to elastically restore the rotation linkage portion and the coupling body,
wherein the rail unit comprises:
a pair of inner rails slidably coupled to the pair of outer rails; and
a stopper coupled to the pair of inner rails and configured to limit a moving distance of the pair of inner rails, and
wherein the stopper comprises:
a first stopping member coupled between the pair of inner rails, and configured to be contactable with a fixed member provided on the rail frame; and
a second stopping member provided in a length direction end portion of the pair of inner rails, and configured to be contactable with a frontal end of the pair of outer rails.

2. The slidable console box of claim 1, wherein the rail unit comprises a plurality of rail casters provided on both lateral surfaces of each of the pair of inner rails, and disposed apart from each other in the length direction.

3. The slidable console box of claim 2, wherein:
a first rail caster, among the plurality of rail casters, disposed on a first surface among the both lateral surfaces of each of the pair of inner rails is in rolling contact with a guide rail protruding downward from an upper portion of a first outer rail among the pair of outer rails; and
a second rail caster, among the plurality of rail casters, disposed on a second surface among the both lateral surfaces of each of the pair of inner rails is in rolling contact with a guide rail protruding upward from a lower surface of a second outer rail among the pair of outer rails.

4. A slidable console box, comprising:
a rail frame fixedly coupled between a driver seat and a passenger seat of a vehicle;
a rail unit slidably coupled to the rail frame along a length direction; and
a movement controller coupled to the rail unit and configured to control a position of the rail unit,
wherein the rail frame comprises:
a pair of outer rails disposed apart from each other in a width direction; and
a positioning member provided between the pair of outer rails, and formed with a plurality of positioning holes in the length direction, and
wherein the movement controller comprises:
a rotation linkage portion;
a coupling body coupled to or decoupled from the positioning member in conjunction with a rotation movement of the rotation linkage portion; and
an elastic portion connected to the rotation linkage portion and the coupling body, and configured to elastically restore the rotation linkage portion and the coupling body,
wherein the coupling body comprises:
a coupling plate having a plurality of insertion protrusions protruding downward to be selectively inserted into at least one positioning hold among the plurality of positioning holes;
a curved portion coupled to the coupling plate, and formed as a curved surface inclined upward in a direction from a first side to a second side; and
a rotation inducing plate coupled to a second side of the curved portion, and disposed to be in contact with the rotation linkage portion.

5. The slidable console box of claim 4, wherein the rotation linkage portion comprises:
a pair of fixed bodies fixedly coupled to an inner rail;
a center shaft coupled between the pair of fixed bodies; and
a lever rotatable around the center shaft and configured to rotate the coupling body by a first end contacting the rotation inducing plate.

6. The slidable console box of claim 5, wherein the elastic portion comprises:
a first elastic member connected to the rotation linkage portion and configured to elastically restore the lever; and
a second elastic member connected to the coupling body, and configured to elastically restore the coupling body.

7. The slidable console box of claim 5, wherein:
when the lever is rotated upward, the coupling plate rotates upward, and at least one inserting protrusion, among the plurality of insertion protrusions, is decoupled from the at least one positioning hole to enable the inner rail to be movable; and
when the lever is elastically restored downward, the coupling plate is elastically restored downward, and the at least one insertion protrusion is coupled to the at least one positioning hole to fix a position of the inner rail.

8. A slidable console box, comprising:
a rail frame fixedly coupled between a driver seat and a passenger seat of a vehicle;
a rail unit slidably coupled to the rail frame along a length direction;
a movement controller coupled to the rail unit and configured to control a position of the rail unit; and
a speed control caster in rolling contact with the rail frame while being rotatably provided in the rail unit,
wherein:
a plurality of rotation center holes each being a rotation center of the speed control caster are provided in the rail unit; and
the plurality of rotation center holes are provided on a lateral side of the rail unit with different heights along a length direction of the rail unit.

9. The slidable console box of claim 8, wherein an overlap amount between the speed control caster and the rail frame is in a range of from 0.5 mm to 2.5 mm.

* * * * *